US008821991B2

(12) United States Patent
Koops et al.

(10) Patent No.: US 8,821,991 B2
(45) Date of Patent: Sep. 2, 2014

(54) PROCESS FOR PREPARING TITANIUM CARBIDE

(75) Inventors: Arne Koops, Neu-Lankau (DE); Sven Reiter, Hamburg (DE); Jochen Stähr, Itzehoe (DE)

(73) Assignee: tesa SE, Hamburg (DE)

( * ) Notice: Subject to any disclaimer, the term of this patent is extended or adjusted under 35 U.S.C. 154(b) by 795 days.

(21) Appl. No.: 12/350,636

(22) Filed: Jan. 8, 2009

(65) Prior Publication Data

US 2009/0181188 A1 Jul. 16, 2009

(30) Foreign Application Priority Data

Jan. 11, 2008 (DE) .......................... 10 2008 004 129
May 28, 2008 (DE) .......................... 10 2008 025 582

(51) Int. Cl.
C23C 14/14 (2006.01)
C23C 14/30 (2006.01)
B05D 3/00 (2006.01)
B41M 5/26 (2006.01)
C03C 17/00 (2006.01)
C03C 23/00 (2006.01)

(52) U.S. Cl.
CPC .............. *B41M 5/262* (2013.01); *C03C 17/007* (2013.01); *C03C 23/0025* (2013.01)
USPC .............................. 427/597; 427/554; 427/596

(58) Field of Classification Search
CPC .......... B41M 5/262; B44C 1/02; C03C 17/22; C03C 17/007; C03C 2217/282; C03C 23/0025; C01B 31/305
USPC .......... 219/121.6, 121.85; 427/554, 596, 597; 430/269, 270.1, 346
See application file for complete search history.

(56) References Cited

U.S. PATENT DOCUMENTS

| 3,161,472 | A | | 12/1964 | Scott |
| 4,698,237 | A | | 10/1987 | Macintyre |
| 5,194,237 | A | * | 3/1993 | Cliche et al. .................. 423/440 |
| 5,206,496 | A | * | 4/1993 | Clement et al. ............... 250/271 |
| 5,987,920 | A | | 11/1999 | Bosman et al. |
| 6,238,847 | B1 | * | 5/2001 | Axtell et al. .................. 430/322 |
| 6,313,436 | B1 | | 11/2001 | Harrison |
| 6,444,068 | B1 | * | 9/2002 | Koops et al. .................... 156/99 |
| 6,503,310 | B1 | | 1/2003 | Sullivan |
| 6,586,518 | B1 | | 7/2003 | Kita et al. |
| 6,825,265 | B2 | * | 11/2004 | Daga et al. .................... 524/544 |
| 6,852,948 | B1 | | 2/2005 | Harrison |
| 2006/0109531 | A1 | * | 5/2006 | Watanabe et al. ................. 359/2 |

FOREIGN PATENT DOCUMENTS

| DE | 697 03 339 | | 4/2001 |
| DE | 101 52 073 | A1 | 5/2003 |
| DE | 102 13 110 | | 10/2003 |
| DE | 102 13 111 | | 10/2003 |

(Continued)

OTHER PUBLICATIONS

Translation of Japanese Office Action issued Apr. 23, 2013.

(Continued)

*Primary Examiner* — Michael Wieczorek
(74) *Attorney, Agent, or Firm* — Norris McLaughlin & Marcus PA

(57) ABSTRACT

A process for preparing titanium carbide using a pigment formulation having at least one titanium compound and a carbon compound and/or elemental carbon, the pigment formulation reacting under laser irradiation to form TiC.

19 Claims, 1 Drawing Sheet

(56) References Cited

FOREIGN PATENT DOCUMENTS

| | | |
|---|---|---|
| DE | 698 16 107 | 5/2004 |
| JP | S61163283 A | 7/1986 |
| JP | 02 271919 | 6/1990 |
| JP | H05170418 A | 7/1993 |
| JP | 09 071726 | 3/1997 |
| TW | I 230 720 B | 4/2005 |
| WO | 99/25562 A1 | 5/1999 |
| WO | 2006031404 A1 | 3/2006 |

OTHER PUBLICATIONS

English Translation of Taiwanese Office Action dated Sep. 13, 2013.

\* cited by examiner

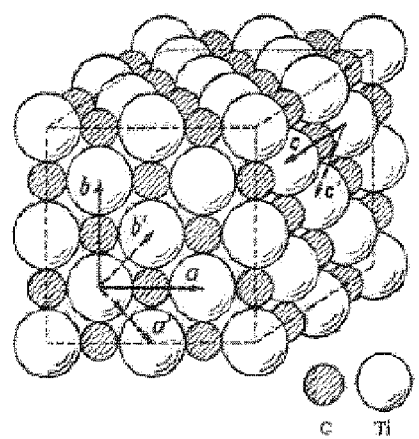

PROCESS FOR PREPARING TITANIUM CARBIDE

The invention relates to a process for preparing titanium carbide (TiC) as described in greater detail hereinbelow and to a specific marking process based on the preparation of TiC.

Titanium carbide is a member of the nonoxide ceramics. Nonoxide ceramics are notable for relatively high covalent and low ionic bonding components, with high chemical and thermal stability, as compared with the silicate ceramics and oxide ceramics. Industrial titanium carbide contains around 19.5% by mass of bonded carbon and up to 0.5% by mass of unbonded carbon, referred to as clear carbon.

The theoretical stoichiometric carbon content is 20.05% by mass.

The properties of titanium carbide compound (TiC) are as follows:
Color: grey metallic
Melting point: 3157° C.
Density: 4.93 g/cm$^3$
Crystal structure: cubic, possessing closest sphere packing, when all of the octahedral gaps are filled: TiC (see FIG. 1)

The following properties/advantages are particularly associated with titanium carbide:
 a relatively high hardness and hence resistance to abrasion and to wear
 a very high heat resistance
 corrosion resistance
 a good biocompatibility
 ferroelectric properties
 a low thermal conductivity (with a high carbon fraction)
 electrical superconduction
 resistance to cold acids and alkalis Titanium carbide is a hard, brittle substance which is similar to titanium and which occurs in cast iron containing titanium. Titanium carbide was first prepared by Moissan in an electric furnace and is nowadays obtained industrially by reducing $TiO_2$ using carbon black or ultrapure graphite ($TiO_2 + 3C \Rightarrow TiC + 2CO$).

The preparation of thin TiC layers by deposition from the gas phase (chemical or physical gas-phase deposition) is also known, as for example from a mixture of $TiCl_4$ with $H_2$ and $CH_4$ or from tetra(neopentyl)titanium.

Alongside tungsten carbide, TiC is the most important carbide industrially, used as a hard material for producing cermets and hard metals such as titanite, for example, for hardening, corrosion-preventing coatings on steel, and for increasing the strength of stainless steels in the nuclear industry.

It is an object of the invention to provide a process for preparing titanium carbide that allows substrates to be coated purposively with a layer of titanium carbide.

This object is achieved in the case of a process with the features described in greater detail hereinbelow.

BRIEF DESCRIPTION OF THE DRAWINGS

The invention to be described will be better understood with reference to the drawing, wherein:
FIG. 1 shows the crystal structure of titanium carbide.

The invention accordingly provides a process for preparing titanium carbide using a pigment formulation. The pigment formulation comprises at least one titanium donor and a carbon donor. Designated as a titanium donor is pure titanium or a titanium compound, having an affinity for providing free titanium as a reaction partner, for a short time in any case, under the action of energy. Where appropriate, the provision of the free titanium may also take place via the route of a titanium-containing intermediate. A carbon donor, in contrast, provides free carbon in particular under energy irradiation. The carbon donor may be a carbon compound and/or may be free, unbonded carbon. Moreover, the pigment formulation may also comprise further components such as, for example, polymers, absorbers, etc. For the formation of titanium carbide, the pigment formulation is irradiated by means of a laser. As a result of the laser irradiation, the titanium and the carbon are provided, as a result, for example, of the breaking of a titanium compound and of a carbon compound, and TiC is formed.

In a preferred embodiment the titanium carbide is formed by being deposited directly on a substrate that is to be coated. This is accomplished in particular by contacting the pigment compound with the substrate prior to laser irradiation.

In one advantageous embodiment the pigment formulation takes the form of a polymer matrix which comprises at least the titanium donor and the carbon donor. The carbon donor may in this case be provided by the polymer matrix itself, though it is also possible for an additional carbon component to be provided, in the form of carbon black, for example. The polymer matrix is designed such that it reacts to the laser irradiation predominantly with pulverization, as a result of which the individual components, more particularly Ti and C, are released and are available for the reaction to form TiC. Given a sufficiently high concentration of free carbon, moreover, this carbon is intercalated into the TiC, as a result of which it is possible to influence the color intensity of the TiC in a purposive way.

This laser-induced pulverization is obtained preferably in the case of brittle materials. Given a sufficiently high output, in conjunction with a plasma, a vapor capillary is formed. As a result of the capillary, the absorption adopts substantially higher values, and so the laser radiation is able to penetrate more deeply into the material and is able to extract the plastic explosively, in particle form, from the matrix, around the zone of thermal influence. This effect can be utilized optimally for the production of a transfer material, with this capillary serving as a reactant space and the resultant powder being reacted, as a titanium donor and carbon donor, for the synthesis of the titanium carbide.

A polymer matrix for the present purposes is any matrix based on polymeric constituents. Besides the polymeric constituents, the matrix may also comprise any desired nonpolymeric constituents; only the main constituent should be polymeric in nature. In particular the term "polymer matrix" also identifies a mixture of a polymeric powder. In a particularly preferred embodiment the polymer matrix is a thermoset polymer matrix. It has emerged that thermosets in particular are especially suitable for obtaining pulverization. In contrast, particularly thermoplastics and elastomers have a tendency to melt on laser radiation, since more laser energy is absorbed than can be transported away by thermal conduction. Local overheating occurs in the form of liquefaction, or even, above a critical intensity, the polymeric material is evaporated. A melt, however, is of only limited suitability for the permanent marking of substrates.

According to a first advantageous embodiment of the invention the titanium donor used is titanium dioxide, preferably in rutile structure. The rutile structure is one of the four crystal polymorphs of titanium dioxide as is known from the specialist literature. The titanium dioxide pigments in rutile structure have a refractive index, n, of 2.75 and absorb fractions of visible light even at wavelengths around 430 nm. They have a hardness of 6 to 7.

In a further preferred embodiment the pigment formulation has carbon black or graphite for the preparation of the free carbon required for the synthesis of titanium carbide. The carbon back is cleaved using energy irradiation, in particular using laser irradiation, and this forms free carbon. In addition, the free carbon may also originate from the polymer matrix decomposed, evaporated, oxidized, depolymerized and/or pyrolyzed on energy exposure, in particular by laser irradiation.

It is preferred to use neutral carbon black with a pH of 6 to 8. This is particularly preferred with a view to a simple handling and to avoid specific safety steps when operating with acidic or basic materials. Preferred suitability is possessed predominantly by thermal black, acetylene black, and lamp black. Lamp black is particularly preferred. The pH value of lamp black is typically 7 to 8, those of thermal black 7 to 9, and those of acetylene black 5 to 8. The pH value of furnace blacks is situated typically at 9 to 11, i.e. these are strongly basic. The pH value of oxidized gas blacks is situated typically at 2.5 to 6, i.e. these are acidic. The use of such acidic or basic carbon blacks in principle, however, is not ruled out.

The stated pigment blacks are extraordinarily resistant to chemicals and are notable for a high level of light fastness and weathering resistance. On account of their very high depth of color and color strength and also of other specific properties, pigment blacks are the most frequently employed black pigments. Pigment blacks are manufactured industrially by thermal oxidative or thermal cleavage of hydrocarbons. Pigment blacks are produced almost exclusively by the furnace black process, the Degussa gas black process, or the lamp black process known from the literature.

According to a further advantageous embodiment of the invention the polymer matrix is a radiation-cured polymer matrix. The polymer matrix is composed advantageously of a varnish, more particularly of a cured varnish, preferably a radiation-cured varnish, with particular preference of an electron-beam-cured aliphatic, difunctional polyurethane acrylate varnish. In one alternative embodiment the polymer matrix consists of a polyester acrylate.

In a preferred embodiment, provision is made for the pigment formulation to be free of plastics which melt under energy irradiation, and also, in particular, free of other melting materials. As a result of this it is possible on the one hand to keep the construction of the product very simple, and, on the other hand, scribed marking is not adversely affected by the melting of plastic or other materials. Furthermore, in the case of the present pigment formulation, it is also possible to do without a glass frit constitute. Surprisingly it has been found that durable bonding of the mark is achieved, particularly on glass, even without a glass frit.

In principle there are four types of varnish which can advantageously be used for the polymer matrix provided their stability is sufficient, for example, acid-curing alkyd-melamine resins, addition-crosslinking polyurethanes, free-radically curing styrene varnishes, and the like. Particularly advantageous, however, are radiation-curing varnishes, on account of their very rapid curing without lengthy evaporation of solvents or exposure to heat. Varnishes of this kind have been described, for example, by A. Vrancken (Farbe und Lack 83, 3 (1977) 171).

According to one particularly advantageous embodiment of the invention the pigment formulation has the following composition:
100 phr polymer matrix, more particularly a radiation-cured aliphatic, difunctional polyurethane acrylate,
0.2 phr to 2.5 phr carbon black, and
45 phr to 65 phr titanium dioxide.

"phr" in this case denotes "parts per hundred resin", a unit commonplace in the polymer industry and used to characterize the compositions of mixtures where all of the polymeric constituents (in this case, therefore, the polymer matrix) are set at 100 phr.

With further preference the composition is as follows:
100 phr polymer matrix, more particularly a radiation-cured aliphatic, difunctional polyurethane acrylate,
0.4 phr carbon black, and
63.2 phr titanium dioxide.

For the purpose of optimizing the properties it is possible for the pigment formulation to have been blended with one or more additives such as plasticizers, fillers, pigments, UV absorbers, light stabilizers, aging inhibitors, crosslinking agents, crosslinking promoters or elastomers.

When the laser beam strikes the pigment formulation the formulation is disintegrated substantially into small particles in the region of the strike point, so that the pulverized material removed from the pigment formulation by laser-induced burning has a number-average particle size of 0.5 to 2.0.

When irradiation is carried out using laser radiation, in the form for example of a laser pulse, the radiation or the laser light comes directly into contact or into action with the surface of the pigment formulation—the impingement of the laser light on the layer converts the laser light into heat, which acts on the surface. The laser beam is coupled into the material by absorption. The absorption has the effect that material is evaporated, particles are extracted from the pigment formulation, and a plasma may be formed. Particularly at the margins of the laser beam exposure there are thermal melting processes.

When the irradiated energy is converted into heat, long-chain polymer constituents of the pigment formulation are typically cleaved, and one of the products of thermal cracking is elemental carbon. In summary, the polymer matrix undergoes particularization/evaporation/decomposition as a result of the high energy input of the laser radiation.

This carbon is deposited in the form of titanium carbide on the product to be scribed. The emission constituents when scribing is carried out are therefore the elemental carbon, the $TiO_2$, and the cracking products from the polymer matrix of the pigment formulation. The following reaction may reflect the process, which can be described as a carbothermal synthesis reaction for the preparation of titanium carbide.

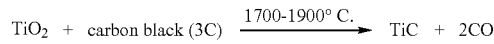

The energy input is determined by the interaction coefficients of the reactants, in particular their absorption characteristics and also the type of laser, and the parameterization of the radiation source. Control is exerted predominantly by way of the laser output and the scribing speed.

Preference is given to using a diode-pumped solid-state laser; the pulse duration of the laser is between 40 and 90 ns, the initial output is 20 watts, and/or the scribing speed is 250 mm/sec to 750 mm/sec, depending on the content of the scribed marking. However, taking into consideration the advancing laser technology, even shorter pulse lengths are conceivable, in particular up to pulse durations in the region of the ns or ps. One such short pulse duration is especially advantageous in particular with respect to short illumination cycles.

As well as the use for scribed markings, the titanium carbide can also be used for thin layers of hard substances which are employed especially on cutting tools and shaping tools in order to improve the wear characteristics. The thickness of layers of hard substances of this kind is generally about 5 μm.

The polymer formulation is preferably present in a pigment layer. A pigment layer is particularly advantageous with respect to ease of use. The thickness of the pigment layer is advantageously situated in the range from about 20 μm to about 500 μm, more particularly in the range from about 30 μm to about 100 μm, in order to provide outstanding compliance with the requirements imposed on it.

According to another advantageous embodiment of the invention the pigment layer is coated partly or over its whole area with an adhesive, more particularly a pressure-sensitive adhesive. An embodiment of this kind is particularly advantageous for allowing ease of application of the pigment layer. By means of the (partial) adhesive layer thus formed it is possible for the pigment layer to be laid firmly on a target substrate in a simple way during laser irradiation, without the risk of displacement of the pigment layer.

The adhesive layer more particularly may be applied in the form of dots or in a screen print, where appropriate also in the form of marginal printing, so that the pigment layer can be adhered to the substrate in any desired way.

The adhesive is preferably a pressure-sensitive adhesive. The pigment layer is coated on one or both sides with the preferred pressure-sensitive adhesive in the form of a solution or dispersion or in 100% form (for example, melt). The adhesive layer or layers may be crosslinked by means of heat or high-energy rays, and if necessary may be lined with release film or release paper. Suitable pressure-sensitive adhesives are described in D. Satas, Handbook of Pressure Sensitive Adhesive Technology (van Nostrand Reinhold). Particular suitability is possessed by pressure-sensitive adhesives based on acrylate, natural rubber, thermoplastic styrene block copolymer or silicone.

For the purpose of optimizing the properties it is possible for the self-adhesive composition employed to have been blended with one or more additives such as tackifiers (resins), plasticizers, fillers, pigments, UV absorbers, light stabilizers, aging inhibitors, crosslinking agents, crosslinking promoters or elastomers. The formulation of the adhesive depends in particular on the intended purpose, that is to say on the kind of adhesive substrate, the prospective duration of adhesion, the ambient conditions, etc.

Suitable elastomers for blending are, for example, EPDM rubber or EPM rubber, polyisobutylene, butyl rubber, ethylene-vinyl acetate, hydrogenated block copolymers of dienes (for example, by hydrogenation of SBR, cSBR, BAN, NBR, SBS, SIS or IR; such polymers are known, for example, as SEPS and SEBS) or acrylate copolymers such as ACM.

Examples of suitable tackifiers are hydrocarbon resins (for example, of unsaturated $C_5$ or $C_7$ monomers), terpene-phenolic resins, terpene resins from raw materials such as α- or β-pinene, aromatic resins such as coumarone-indene resins, or resins of styrene or α-methylstyrene, such as rosin and its derivatives, such as disproportionated, dimerized or esterified resins, the use of glycols, glycerol or pentaerythritol being possibilities, and also others as set out in Ullmanns Enzyklopädie der technischen Chemie, volume 12, pages 525 to 555 (4th edition), Weinheim. Particularly suitable are resins which are stable to aging and have no olefinic double bond, such as hydrogenated resins, for example.

Examples of suitable plasticizers are aliphatic, cycloaliphatic, and aromatic mineral oils, diesters or polyesters of phthalic acid, trimellitic acid or adipic acid, liquid rubbers (for example, nitrile rubbers or polyisoprene rubbers), liquid polymers of butene and/or isobutene, acrylic esters, polyvinyl ethers, liquid resins and plasticizer resins based on the raw materials for tackifier resins, wool wax and other waxes, or liquid silicones.

Examples of suitable crosslinking agents are phenolic resins or halogenated phenolic resins, melamine resins, and formaldehyde resins. Suitable crosslinking promoters are, for example, maleimides, allyl esters such as triallyl cyanurate, and polyfunctional esters of acrylic and methacrylic acid.

The thickness of coating of adhesive is situated preferably in the range from 5 to 100 $g/m^2$, more particularly 10 to 25 $g/m^2$.

With further preference the pigment layer is applied on a carrier, preferably on a carrier sheet. The application is advantageously carried out by a coating of the pigment layer onto the carrier.

As a carrier sheet, it is possible to use, preferably, films which are transparent, more particularly monoaxially and biaxially oriented films based on polyolefins, films based on oriented polyethylene or oriented copolymers containing ethylene units and/or polypropylene units, and also, if appropriate, PVC films and/or films based on vinyl polymers, polyamides, polyester, polyacetals or polycarbonates. PET films are also outstandingly suitable carriers. Films based on oriented polyethylene or oriented copolymers containing ethylene units and/or polypropylene units are also suitable as a carrier sheet.

Further preference is given to single-ply biaxially or monoaxially oriented films and multiply biaxial or monoaxial films based on polypropylene. Films based on unplasticized PVC are used, as are films based on plasticized PVC. Films based on polyester, such as, for example, polyethylene terephthalate, are likewise known and are suitable as a carrier for the pigment layer.

Parts of the pigment layer may have been deactivated by means of a partially applied passivating layer. This is done in particular in regions where there is to be no coating or marking with titanium carbide. Passivating takes place in particular on the side of the pigment layer which is in contact with the substrate during laser irradiation. Passivation may take place, for example, in the form of a negative representation of the desired marking, so that the marking itself can take place subsequently by areal irradiation.

The pigment layer and/or this layer with carrier sheet and/or adhesive coating, and also all further layers, may be present, for the purposes of this invention, in the form of all sheetlike structures, such as two-dimensionally extended films or film sections, tapes with extended length and limited width, tape sections, diecuts, labels, and the like. Also possible is the winding of a comparatively long pigment layer to form an archimedean spiral, from which a section of desired length is separated for use in each case.

With further preference the pigment layer of the invention can be used in a process for marking a substrate, more particularly glass, the pigment layer being brought into direct contact with the substrate to be inscribed, by means of pressing, and then the pigment layer being irradiated by means of laser radiation. The irradiation pulverizes the polymer matrix, free carbon is formed, and in the irradiated regions a marking is formed on the substrate.

The direct contact between pigment layer and substrate avoids an intermediate space which leads to an enlargement of the reaction space during laser irradiation. A consequence of this would be to allow the precipitation on the substrate to be distributed over a relatively large surface area, and so the definition of the resulting scribed marking would be less.

This process is suitable in particular for the marking of transparent substrates, such as glass, for example, since scribed marking can take place through the substrate. In other words, the radiation penetrates the substrate, or else, possibly, two or more layers of the substrate in the case of a corresponding structure such as a tube, and interacts with the pigment layer disposed on the substrate, as a result of which, as described above, the marking is formed on the side of the substrate remote from the radiation source. The scribed marking of glass, in particular, by means of the above-described pigment layer has proven particularly advantageous. Scribed marking can place with relatively short exposure times, and the scribed marking is durably bonded to the glass. Moreover, scribed marking may be carried out without visible damage to the glass.

The pigment layer can be employed with particular advantage for the marking of glass. A corresponding glass article encompasses sheets, containers or tubes, generally convex or concave glass surfaces. With glass in particular, all of the advantages of the inventive pigment layer are exploited: The resulting marking is extremely robust. The scribing outcome is very good. Moreover, the level of fume generated is surprisingly low. Directly after scribing, the indicia showed a very high contrast. The unfixed residue can be removed by dry or wet wiping of the identity-marking surface.

Particularly when the standard lasers are utilized, more especially the widespread Nd-YAG solid-state lasers with a wavelength of 1.06 µm, the scribed markings and identity markings obtained are sharply defined and of high contrast.

With the pigment layer, it is possible to achieve scribed markings which have a resolution in the µm order of magnitude. With further preference the applied marking is an interference hologram, since the resolution quality of the process allows structures for amplifying and extinguishing light. Alternatively, scribed marking may also take place in the form of a computer-generated hologram. A computer-generated hologram makes it possible, as a result of the calculation of the hologram structure and the application of this structure by laser irradiation, to individualize the identification, which by virtue of its configuration is difficult to counterfeit and, accordingly, affords high protection against forging. Moreover, it is easy to incorporate information in a hidden form into a structure of this kind.

The surface to be scribed is preferably cleaned before the pigment layer is applied. In addition it is advantageous to clean residues from the substrate surface and/or to remove the pigment layer no longer needed after the laser radiation and consequently the marking has been applied. In this case it is particularly advantageous if the pigment layer is applied substantially only to regions of the surface that are later to be scribed or marked.

Owing to the formation of inclusion compounds or interstitial compounds (formation of lattice interstices), it is possible for small carbon atoms to be intercalated at lattice interstices or gaps in the crystal lattice, these atoms then giving the titanium carbide a black color. This also results, ultimately, in a high-contrast black scribed marking on the substrate to be scribed.

In other words, the very high-contrast scribed marking on the product to be scribed comes about as a result of the fact that titanium carbide is deposited on the product, the gaps in the crystal lattice being penetrated by free carbon atoms which originate, for example, from the carbon black or from cracked elemental carbon from the polymer matrix.

The scribed marking formed on the glass has a height of 0.25 to 3.0 µm, depending on the content of the scribed marking and the parameterization. The temperature stability has been shown to be in the range from −50° C. to 1200° C. The low-temperature resistance and heat resistance, however, are significantly higher. The mechanical resistance to abrasion is extremely high (Crock meter test>1000 strokes).

The scribed marking exhibits a high accuracy of resolution, depending on the beam quality used, the line width is 70 µm to 80 µm. For example, it is possible to produce machine-readable 2D codes with an edge length of 1.5 mm×1.5 mm and a content of 16 characters. Moreover, all typical identity marking content, such as logos, pictograms, drawings, alphanumeric symbols, special symbols, and pixel graphics, can be realized.

Furthermore, it is possible to realize all typical identification contents, such as logos, pictograms, drawings, alphanumeric symbols, special symbols, and pixel graphics.

The above-described pigment formulation and also the corresponding scribed marking process are suitable in particular for the following fields of application where secure identity marking of glass containers in particular is very important:

biotechnological, medical and primary, secondary, and tertiary pharmaceutical packaging made of glass packaging made of glass for chemicals, auxiliaries, foods and luxury goods containers and/or components made of glass for surgical, therapeutic, and diagnostic procedures containers and/or components for industrial and analytic processes (pipettes, pH meters, etc.)

containers and/or components for biological processes which relate to active/inert cell material.

In the text below, the composition of a polymer formulation is illustrated in more detail using an example, without any restrictive effect whatsoever:

| Substrate | Amount [phr] |
| --- | --- |
| EB 284 | 85.1 |
| HDDA | 5.0 |
| DVE 3 | 9.9 |
| carbon black | 0.4 |
| titanium dioxide | 63.2 |
| sum total | 163.6 |

EB 284: aliphatic, difunctional polyurethane acrylate (manufacturer: Cytec)
HGDDA: hexanediol diacrylate (manufacturer: BASF)
DVE 3: divinyl ether (manufacturer: ISP or BASF)
carbon black: furnace black with a particle size of 56 nm, surface area 45 m$^2$/g (manufacturer: Evonik, Printex 25)
TiO$_2$: (manufacturer: Kronos, Kronos 2160)

The composition is coated out to form a layer with a thickness of 100 µm. Specimens measuring 30×50 mm are produced from the coat by punching.

What is claimed is:

1. A process for preparing titanium carbide (TiC) comprising irradiating a pigment formulation with a laser having sufficient output to induce pulverization of the pigment formulation, said pigment formulation being a polymer matrix comprising at least one titanium donor, said polymer matrix functioning as a carbon donor and being predominantly pulverized as a result of the laser irradiation thereby forming a plasma, and wherein the pigment formulation reacts under laser irradiation to form TiC.

2. The process as claimed in claim 1, wherein the titanium carbide is deposited on a substrate.

3. The process as claimed in claim 1, wherein the preparation of titanium carbide is carried out with the exclusion of a glass frit and/or with the exclusion of a plastic which melts under energy irradiation.

4. The process as claimed in claim 1, wherein the titanium donor used is titanium dioxide.

5. The process as claimed in claim 1, wherein the polymer matrix is a radiation-cured polymer matrix and/or wherein the polymer matrix used is a thermosetting polymer matrix.

6. The process as claimed in claim 1, wherein a pulverized material is removed from the pigment formulation by laser-induced burning, the pulverized material having a number-average particle size of 0.5 μm to 2.0 μm.

7. The process as claimed in claim 1, wherein the pigment formulation is a pigment layer with a thickness in the range from 20 μm to 500 μm.

8. The process as claimed in claim 1, wherein the pigment formulation is a pigment layer which is coated partly or over its whole area with an adhesive.

9. The process as claimed in claim 1, wherein the pigment formulation is a pigment layer which is applied on a carrier.

10. The process as claimed in claim 1, wherein the pigment formulation is a pigment layer which is deactivated by a partially applied passivating layer.

11. The process as claimed in claim 1, wherein the laser irradiation is performed with a pulsed laser.

12. The process of claim 1, wherein said polymer matrix comprises a further carbon donor.

13. The process of claim 12, wherein said further carbon donor is carbon black.

14. The process as claimed in claim 13, wherein the pigment formulation has the following composition:
   100 phr polymer matrix,
   0.2 phr to 2.5 phr carbon black, and
   45 phr to 65 phr titanium dioxide.

15. The process as claimed in claim 13, wherein free carbon is formed as a carbon donor by the carbon black on laser exposure.

16. A process for marking a substrate with formation of titanium carbide, comprising applying a pigment formulation in the form of a thermoset polymer matrix comprising a titanium donor and optionally a carbon donor to the substrate to be marked and irradiating with a laser having sufficient output to induce pulverization of the thermoset polymer matrix, in which the laser radiation interacts with the pigment formulation, and, in the regions irradiated, TiC is deposited as a marking on the substrate.

17. The process as claimed in claim 16, wherein the substrate used is a transparent substrate, and wherein the irradiation of the pigment formulation is performed through the substrate in such a way that the marking is developed on the side of the substrate remote from the laser source.

18. The process as claimed in claim 16, wherein the marking is performed with exclusion of a glass frit and/or with exclusion of a plastic which melts under energy irradiation.

19. The process as claimed in claim 16, wherein the marking applied is an interference hologram or a computer-generated hologram.

* * * * *